United States Patent
Slaughter

(10) Patent No.: US 12,066,269 B1
(45) Date of Patent: Aug. 20, 2024

(54) REMOTELY ACTUATED GUN FOR FIRING PEPPERBALLS, PAINTBALLS OR BREAKERBALLS AND MOUNTING ASSEMBLY THEREFOR

(71) Applicant: Jerry Micah Slaughter, Huntsville, TX (US)

(72) Inventor: Jerry Micah Slaughter, Huntsville, TX (US)

( * ) Notice: Subject to any disclaimer, the term of this patent is extended or adjusted under 35 U.S.C. 154(b) by 3 days.

(21) Appl. No.: 18/141,084

(22) Filed: Apr. 28, 2023

(51) Int. Cl.
| | |
|---|---|
| *F41B 11/00* | (2013.01) |
| *B64D 7/02* | (2006.01) |
| *B64U 10/14* | (2023.01) |
| *F41B 11/52* | (2013.01) |
| *F41B 11/71* | (2013.01) |
| *F41B 11/80* | (2013.01) |
| *F41G 1/35* | (2006.01) |
| *F41G 3/16* | (2006.01) |
| *B64U 101/00* | (2023.01) |
| *H04B 1/02* | (2006.01) |
| *H04B 1/06* | (2006.01) |

(52) U.S. Cl.
CPC .............. *F41B 11/71* (2013.01); *B64D 7/02* (2013.01); *B64U 10/14* (2023.01); *F41B 11/52* (2013.01); *F41B 11/80* (2013.01); *F41G 1/35* (2013.01); *F41G 3/165* (2013.01); *B64U 2101/00* (2023.01); *B64U 2201/20* (2023.01); *H04B 1/02* (2013.01); *H04B 1/06* (2013.01)

(58) Field of Classification Search
CPC ......... F41B 11/62; F41B 11/72; F41B 11/723; F41B 11/71; F41B 11/64; F41B 11/52; F41B 11/80; F41A 3/58; F41A 3/66; F41C 7/11; B64D 7/02; B64U 10/14; B64U 2101/00; B64U 2201/20; F41G 1/35; F41G 3/165; H04B 1/02; H04B 1/06

USPC ................................................ 124/71–77, 56
See application file for complete search history.

(56) References Cited

U.S. PATENT DOCUMENTS

| | | | | |
|---|---|---|---|---|
| 2,273,678 | A * | 2/1942 | Webby ................. | F41B 11/723 124/75 |
| 2,299,073 | A * | 10/1942 | Beasley ................ | F41B 11/683 137/625.37 |
| 2,940,438 | A * | 6/1960 | Merz ...................... | F41B 11/62 124/51.1 |
| 3,056,395 | A * | 10/1962 | Merz ...................... | F41B 11/62 124/31 |
| 4,770,153 | A * | 9/1988 | Edelman .............. | F41B 11/724 137/505.22 |
| 5,778,868 | A * | 7/1998 | Shepherd .............. | F41B 11/52 124/76 |
| 5,913,303 | A * | 6/1999 | Kotsiopoulos ........ | F41B 11/724 124/31 |
| 7,882,830 | B1 * | 2/2011 | Gabrel .................. | F41B 11/723 124/75 |

(Continued)

*Primary Examiner* — Michael D David
(74) *Attorney, Agent, or Firm* — John R Casperson

(57) ABSTRACT

The invention comprises an electropneumatically operated semi-automatic gun configured for remote firing of pepperballs, breakerballs, paintballs, etc., and a carrier for the gun comprising a bracket and a pair of struts extending downwardly from the bracket. The body of the gun is attached beneath the bracket and hangs otherwise unsupported in a space defined between the struts. The gun thus mounted can be hung beneath various types of quadracopter drones, or mounted atop shelving or to ROVs.

19 Claims, 7 Drawing Sheets

(56) References Cited

U.S. PATENT DOCUMENTS

| | | | |
|---|---|---|---|
| 10,955,216 B2* | 3/2021 | Pedicini | F41B 11/64 |
| 2003/0047175 A1* | 3/2003 | Farrell | F41B 11/71 |
| | | | 124/56 |
| 2004/0065310 A1* | 4/2004 | Masse | F41B 11/71 |
| | | | 124/75 |
| 2006/0124118 A1* | 6/2006 | Dobbins | F41B 11/62 |
| | | | 124/77 |
| 2006/0162716 A1* | 7/2006 | Dobbins | F41B 11/70 |
| | | | 124/77 |
| 2009/0241931 A1* | 10/2009 | Masse | F41B 11/71 |
| | | | 124/76 |
| 2011/0232618 A1* | 9/2011 | Gabrel | F41B 11/723 |
| | | | 124/73 |
| 2012/0192847 A1* | 8/2012 | Hague | F41B 11/721 |
| | | | 124/73 |
| 2014/0096758 A1* | 4/2014 | Gardner, Jr. | F16K 27/044 |
| | | | 124/73 |
| 2016/0146567 A1* | 5/2016 | Nachefski | F41B 11/62 |
| | | | 124/73 |
| 2018/0120051 A1* | 5/2018 | Hague | F41B 11/723 |
| 2020/0132412 A1* | 4/2020 | Pedicini | F41B 11/64 |

* cited by examiner

REMOTELY ACTUATED GUN FOR FIRING PEPPERBALLS, PAINTBALLS OR BREAKERBALLS AND MOUNTING ASSEMBLY THEREFOR

FIELD OF THE INVENTION

In one embodiment, this invention relates to a mounting assembly. In another embodiment, this invention relates to a remotely actuated pneumatic gun for firing pepperballs, breakerballs, or paintballs. In a further embodiment, this invention relates to a mounting assembly that carries a remotely actuated pepperball or paintball gun.

BACKGROUND OF THE INVENTION

Paintball guns are well known devices that fire capsules containing marking paint at limited velocities with compressed gas. They are primarily used for entertainment purposes. Slightly modified guns can be used for deterrent or defensive purposes when loaded with pepperballs, which are frangible capsules containing capsaicin, typically powdered, or other irritant, or breakerballs, which can break glass or deter by impact strike.

Drones and ROVs are well known devices typically used for entertainment or observation. It is known to provide such devices with pepperball guns for crowd control but the devices are engineered for purpose and are expensive.

What is needed is an inexpensive remotely operated pneumatic gun that can be adapted for sentinel duty as well as for use on drones or ROVs with different types of balls.

Also desirable would be a remotely operated pepperball gun that could optionally fire breakerballs if needed, or paintballs to mark a person or livestock.

What would also be desirable would be a fixture or mounting assembly to attach a pneumatic gun to a wide range of drones or ROVs as well as to shelves for stationary applications.

OBJECTS OF THE INVENTION

It is an object of this invention to provide a remotely actuated pneumatic gun.

It is another object of this invention to provide a pneumatic gun carried in a mounting assembly that facilitates it use in different applications.

SUMMARY OF THE INVENTION

One embodiment of the invention provides an electro-pneumatically operated semi-automatic gun. The gun comprises a body, a barrel, a tank, a loader, a battery, a radio receiver, and a solenoid valve. The barrel is attached to the body. The tank is attached to the body and contains propellant. The loader is attached to the body and is for feeding balls to the barrel. The radio receiver is for receiving a radio signal from a remote transmitter and providing an electrical signal that passes through circuitry to actuate the solenoid valve to permit propellant flow from the tank to fire a ball from the loader through the barrel. The battery provides electrical power to the receiver and the solenoid valve.

In a preferred embodiment of the invention, the above-described pneumatic gun is used in conjunction with a carrier. The carrier comprises a plate or bracket and legs or a pair of struts extending downwardly from the plate or bracket. The body of the pneumatic gun is attached beneath the plate or bracket and hangs otherwise unsupported in a space defined between the legs or struts. The pneumatic gun thus mounted can be hung beneath various types of quadracopter drones, or mounted atop shelving or to ROVs.

In one embodiment, the pneumatic gun is attached to the plate or bracket via a remotely actuated powered gimbal.

DETAILED DESCRIPTION OF THE INVENTION

Figure 1:
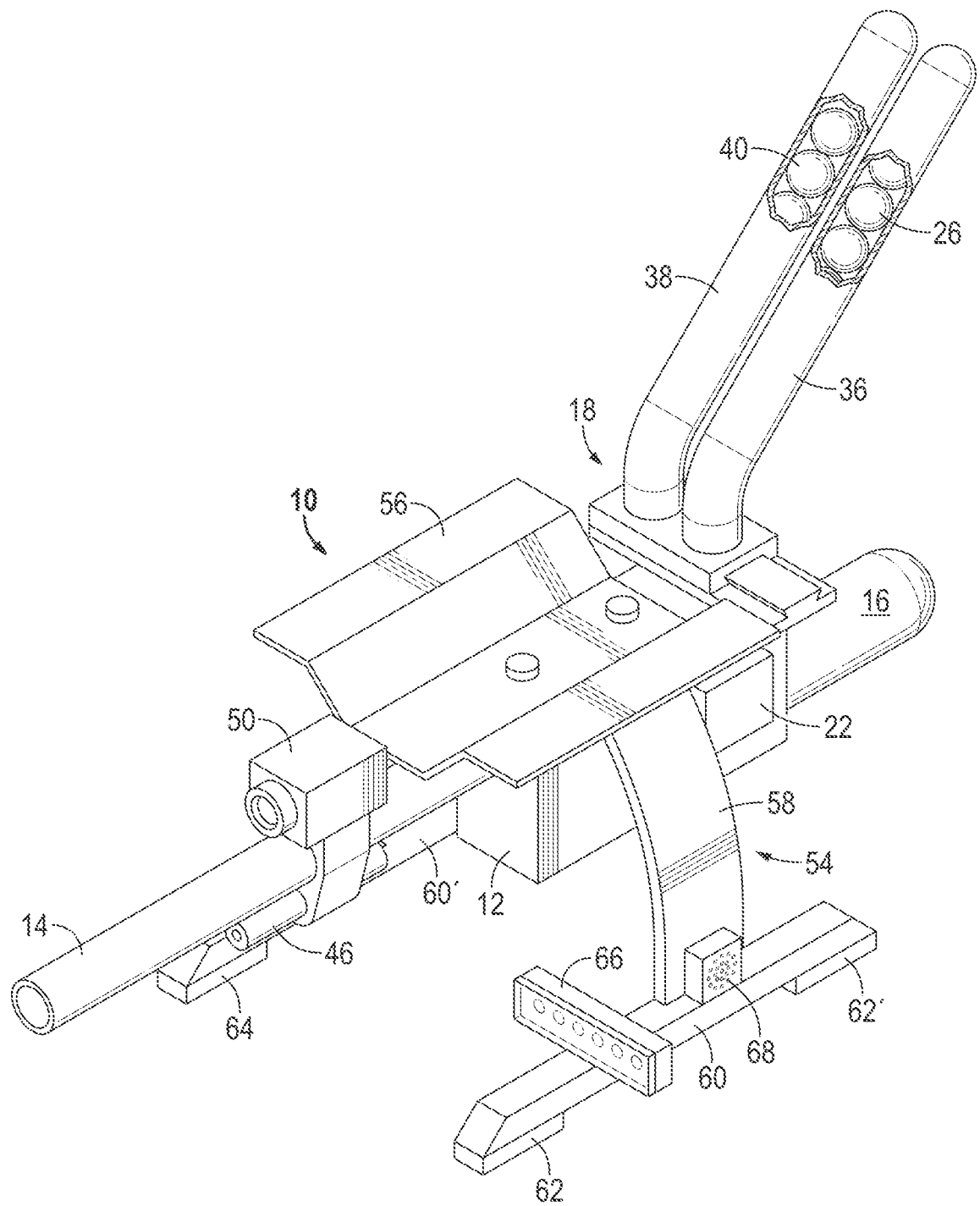
FIG. 1 is an isometric view of one embodiment of the invention.
Figure 2:
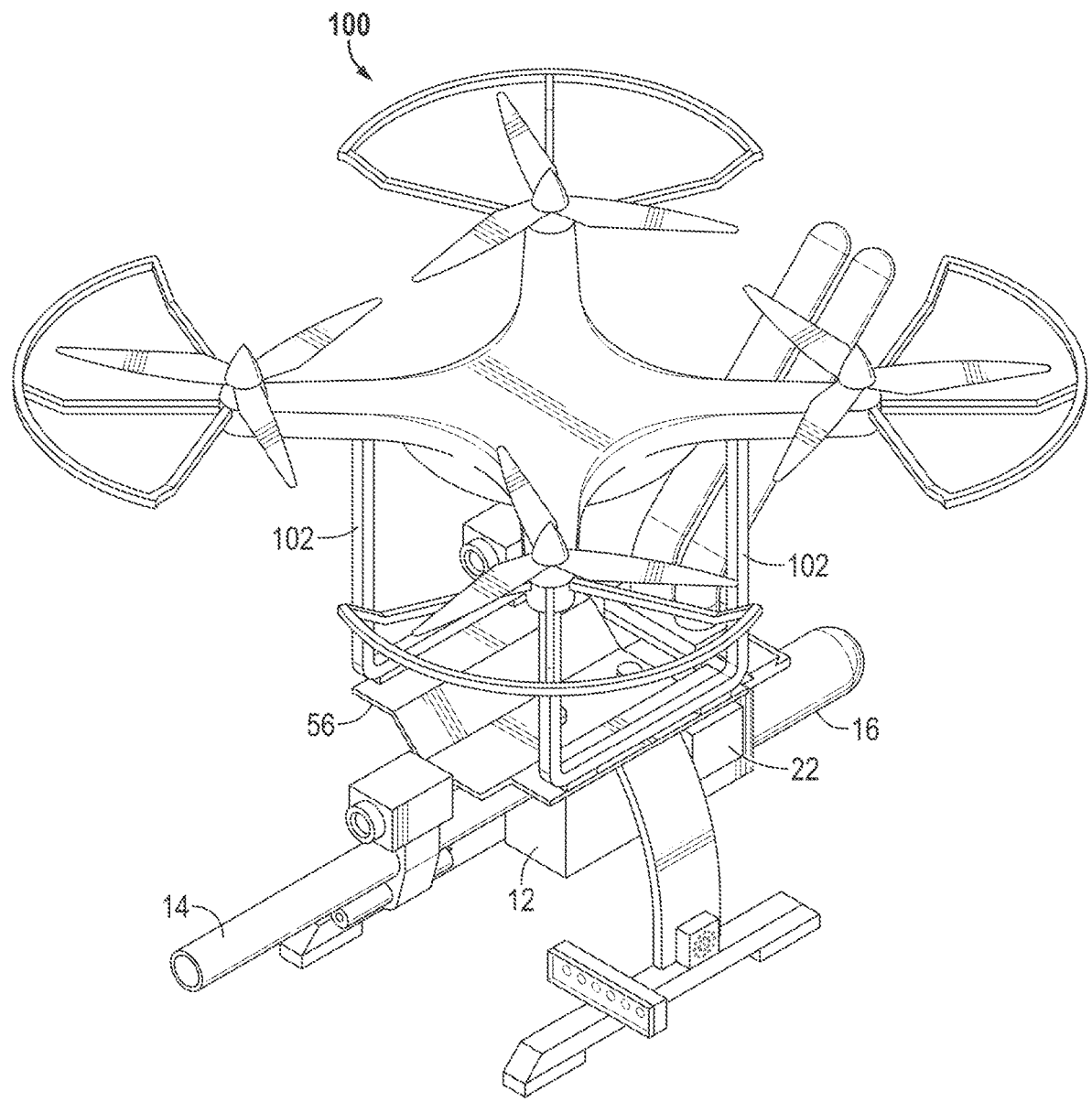
FIG. 2 is an isometric view of another embodiment of the invention employing the device of FIG. 1.
Figure 3:
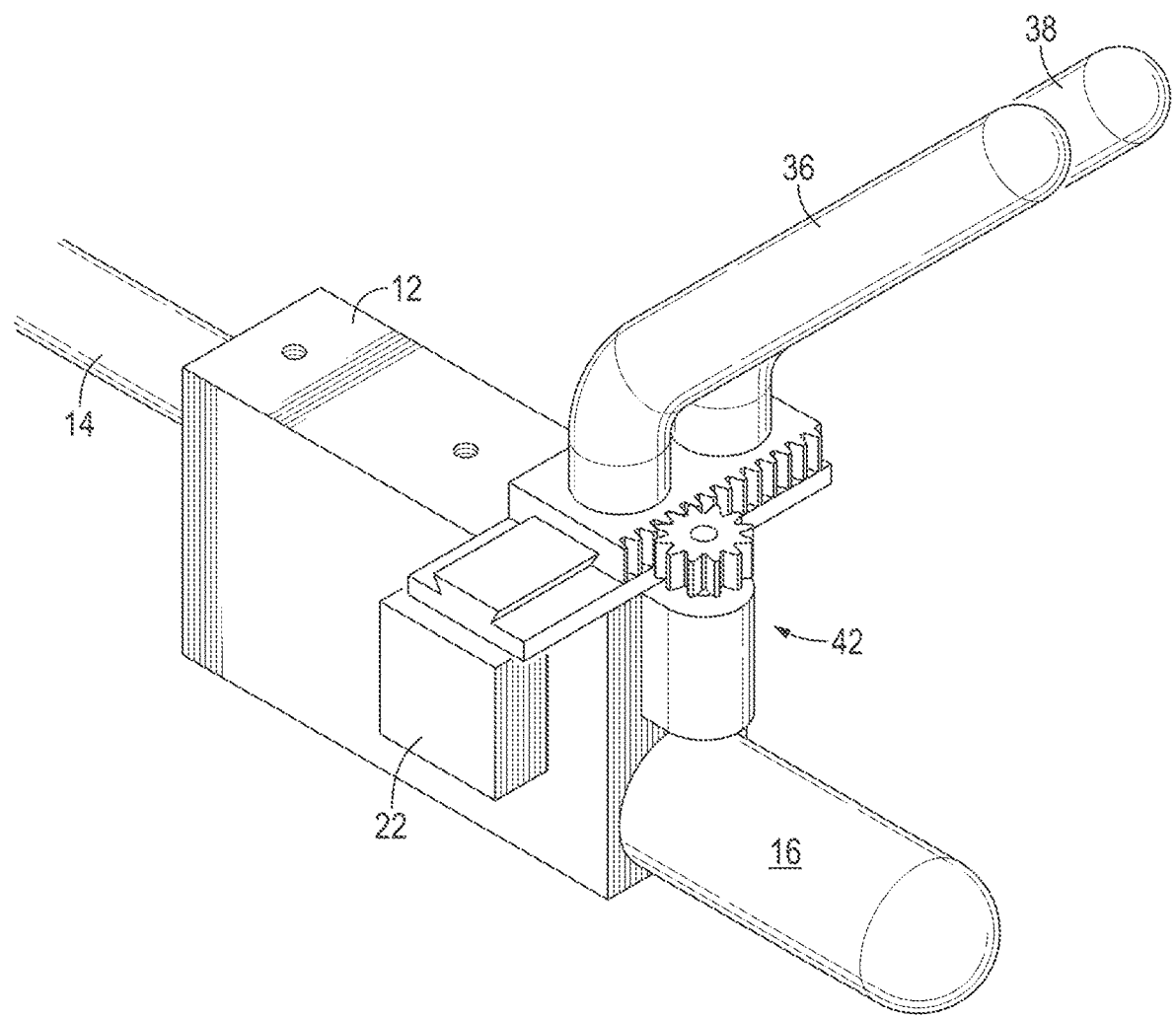
FIG. 3 is an isometric view a portion of the invention of FIGS. 1 and 2 hidden from view.
Figure 4:
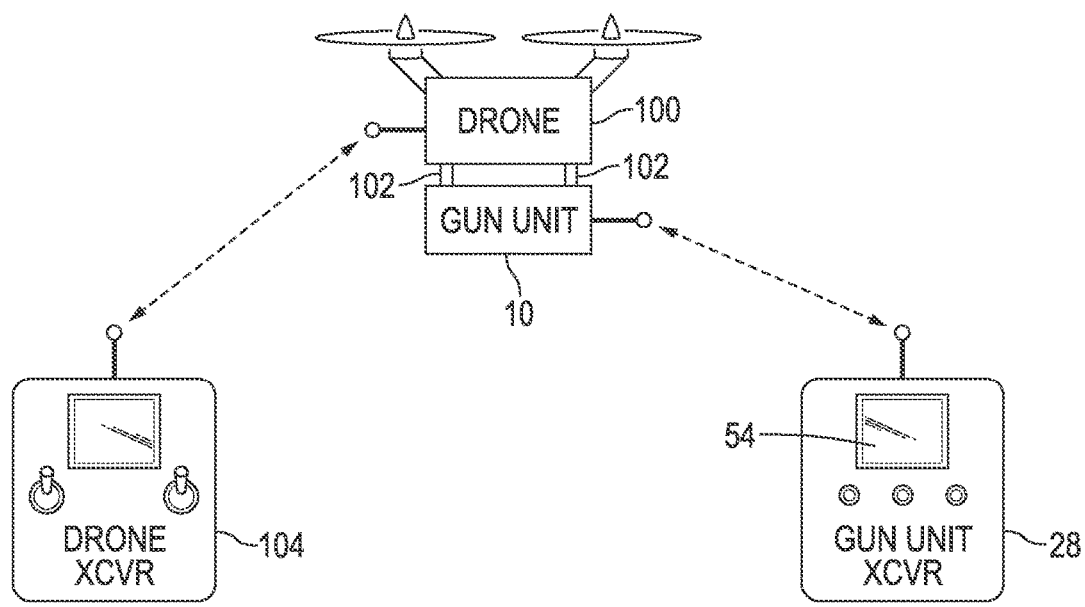
FIG. 4 is a schematic illustration of use of the invention of FIG. 2.
Figure 5:
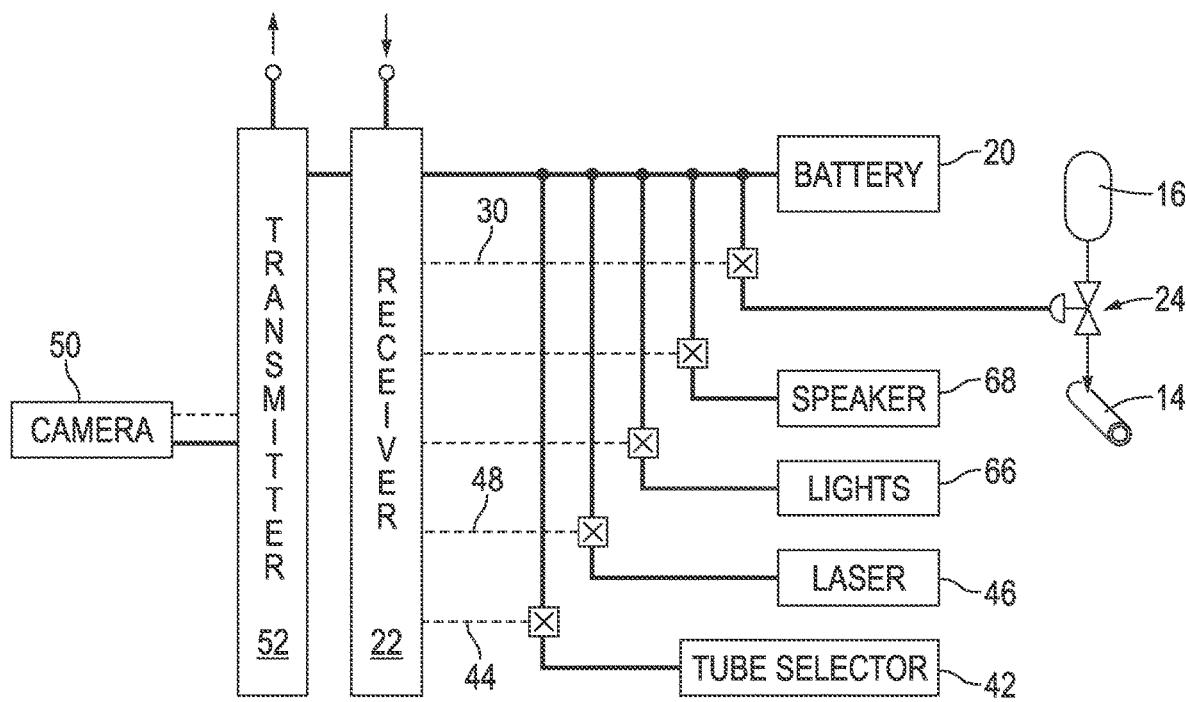
FIG. 5 is a schematic illustration of circuitry employed in the invention of FIG. 2, with a signal from a radio receiver actuating a relay to provide battery power to a component.

One embodiment of the invention provides an electro-pneumatically operated semi-automatic gun 10. The gun comprises a body 12, a barrel 14, a tank 16, a loader 18, a battery 20 (see FIG. 5), a radio receiver 22, and a solenoid valve 24 (see FIG. 5). The barrel is attached to the body. The tank is attached to the body and contains propellant. The propellant is preferably compressed air or carbon dioxide. The loader is attached to the body and is for feeding balls such as pepperballs 26 to the barrel. The radio receiver is for receiving a radio signals from a remote transmitter 28 (see FIG. 4) and providing an electrical signal that passes through circuitry 30 (see FIG. 4) to actuate the solenoid valve to permit propellant flow from the tank to fire a ball from the loader through the barrel. The battery provides electrical power to the receiver and the solenoid valve. A major difference between the invention as just described and the prior art is actuating the solenoid valve with an electrical signal from a radio receiver rather than from a sensor actuated by a trigger. Semi-automatic operation of the gun using propellant as the motive force and additional electronically controlled valves is known and will not be detailed herein.

Figure 6:
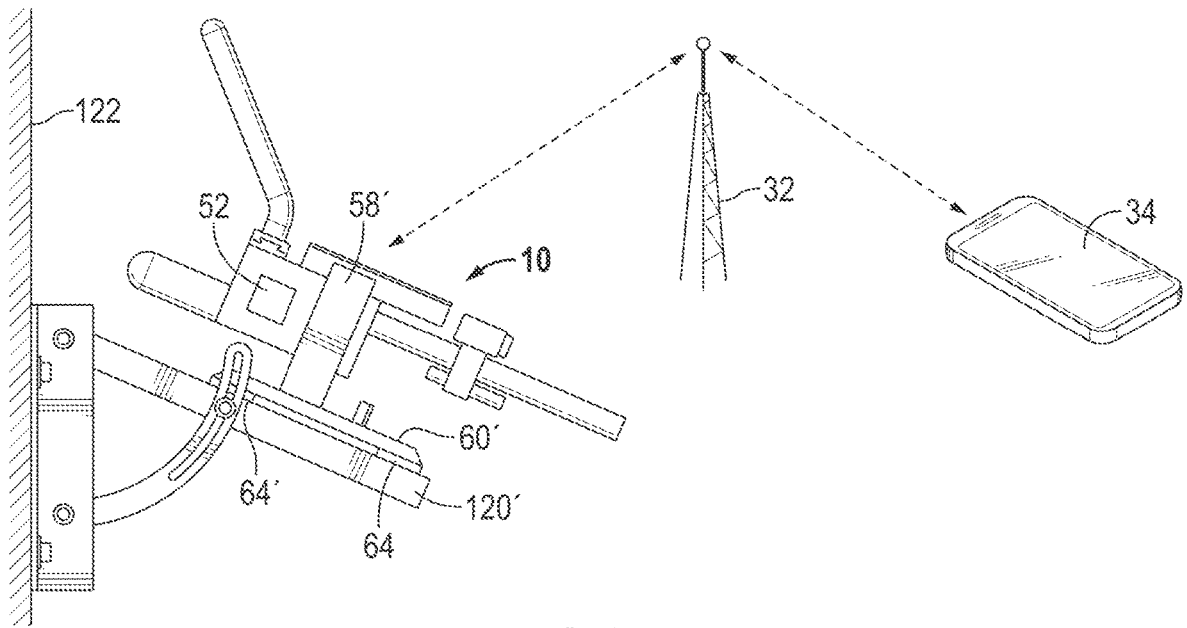
FIG. 6 is an elevation view of another embodiment of the invention, partly in schematic.
Figure 7:
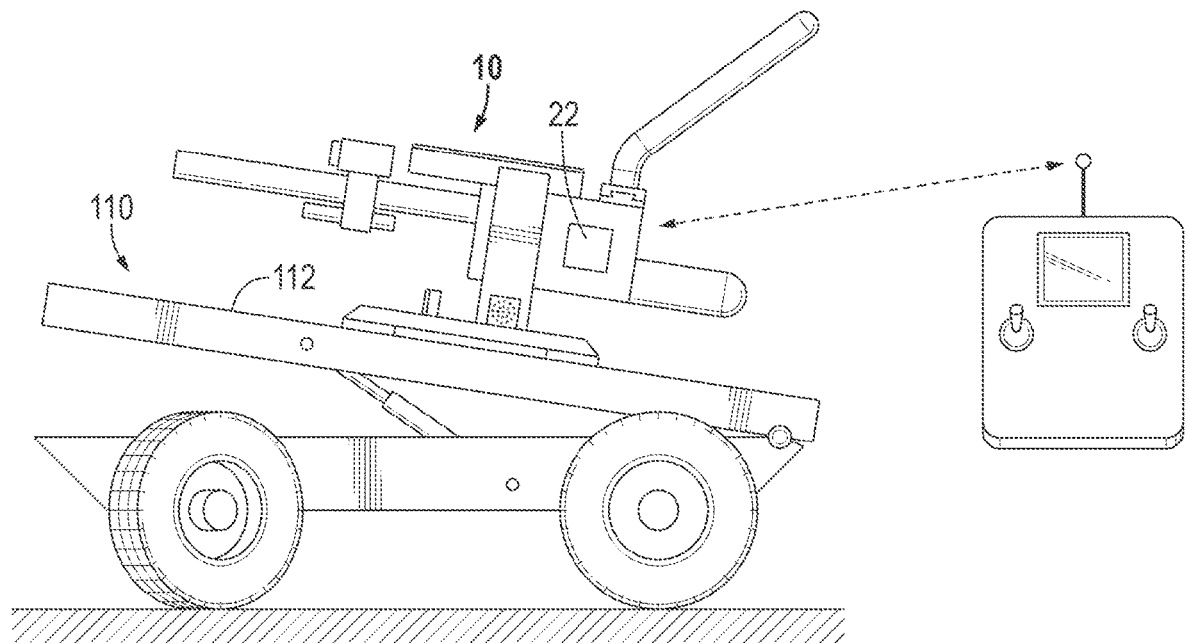
FIG. 7 is an elevation view of another embodiment of the invention, partly in schematic.

If desired, the remote transmitter can comprise a cell phone tower 32 used in conjunction with a smart phone or equivalent 34 to send the radio signals indirectly to a compatible radio receiver which receives the radio signals and provides responsive electrical signals to actuate the components of the gun. See FIG. 6.

In one embodiment, the loader comprises a gravity feeding tube 36 containing the pepperballs 26. In another embodiment, the loader further comprises a second gravity feeding tube 38 containing breakerballs 40 or other type of balls such as marker balls. An electrically actuated driver 42 selects which tube to place in feeding communication with the barrel and the radio receiver further provides an electrical signal responsive to a radio command signal from the remote unit that passes through circuitry 44 to actuate the driver.

In another embodiment of the invention, a laser 46 is mounted to the pepperball gun for producing a laser beam to indicate by laser beam illumination an aiming point for the pepperball gun at a predetermined distance. As illustrated, the laser is attached to the barrel. As an example, the laser is attached to the barrel and the predetermined distance is about 50 feet. In the illustrated embodiment, the laser can be actuated remotely via the radio receiver via circuitry 48.

Where the drone does not have its own video camera, the gun preferably further comprises a digital video camera 50 mounted to the gun and oriented to record an area aligned with the barrel including the aiming point for gun. A radio transmitter 52 (see FIG. 6) is mounted to the pepperball gun. The radio transmitter is operably associated with the digital video camera for transmitting images including images of the aiming point to a radio receiver at a remote location. The radiowave receiver is of a type including a viewer screen. See FIG. 4. Preferably, the remote receiver is a receiver/transmitter so that command signals responsive to what the operator sees on the viewer can be sent back to the gun.

In a preferred embodiment, the gun is used in conjunction with a carrier 54. The carrier comprises a bracket 56 having a top side and a bottom side. The top side of the body of the gun is attached beneath the bracket. A pair of struts 58, 58' extending downwardly from the bracket to position the body of the gun in a space defined between the pair of struts that is above ground level. In a further preferred embodiment, the carrier further comprises a pair of parallel skids 60, 60' attached to the pair of parallel struts, one skid to a lower end of each strut, each skid being generally parallel to the barrel. More preferably, each skid has a first end a second end, a top side and a bottom side, and a pair of pads 62, 62', 64, 64' is attached to a bottom side of each skid, one pad of the pair near the first end, the other pad of the pair near the second end.

In a preferred embodiment of the invention, the carrier further comprises a light 66 and a speaker 68 wired to the receiver for remote actuation. See FIG. 5.

In one embodiment, the invention is used in combination with a remotely operated quadracopter drone 100 having a plurality of landing struts 102 attached by the plurality of landing struts to the top side of the bracket 56 of the carrier for the pepperball gun. The drone will usually have its own remote transmitter/controller 104.

In another embodiment, the invention is used in combination with a remotely operated vehicle 110 having a tiltable bed 112 attached to the skids of the carrier for the gun.

In another embodiment, the invention is used in combination with a shelf 120 protruding from a wall 122, the shelf being attached to the skids of the carrier for the gun. In this embodiment, the barrel of the gun could be oriented toward a door or a pay window, for example and remotely monitored.

Figure 8:
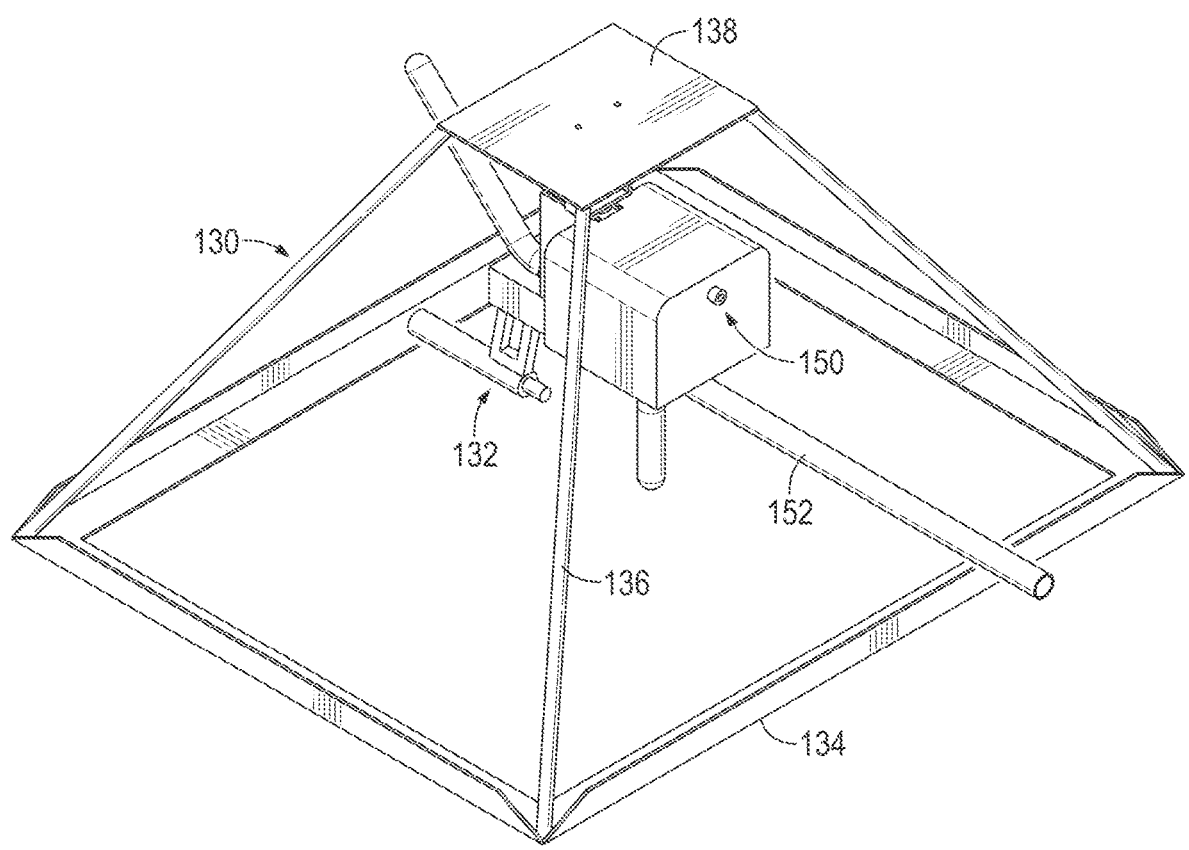
FIG. 8 is an elevation view of another embodiment of the invention.
Figure 9:
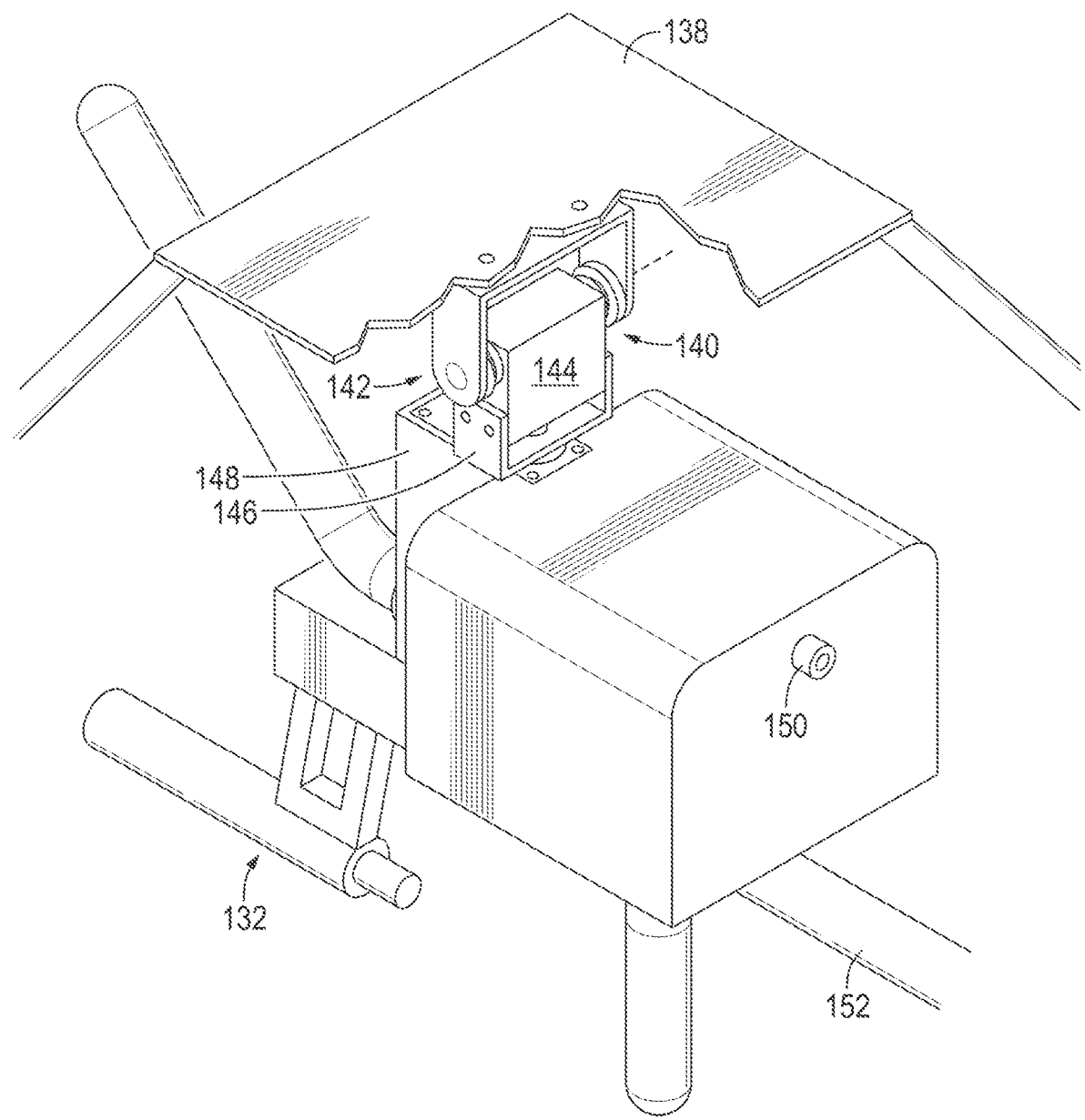
FIG. 9 is an elevation view of a portion of the embodiment shown in FIG. 8, with a portion broken away to show underlying details.

Another embodiment of the invention is shown in FIGS. 8-9. A lightweight, for example, aluminum, carrier 130 supports the gun 132. The carrier comprises a closed polygonal base 134 with a plurality of legs 136 connecting the base to an upper plate 138, from which the gun is suspended by a remotely actuated powered gimbal 140. The polygonal base is defined by folded elongated members and the legs are defined by tubular members.

The remotely actuated powered gimbal 140 connects the bottom side of the plate to the body of the gun. The powered gimbal provides tilt and pan functionality to the gun with respect to the plate. In the embodiment shown, the powered gimbal comprises a first yoke 142 attached to the bottom side of the plate. A tilter device 144 is rotatably attached to the first yoke for tilting movement with respect to the first yoke. A second yoke 146 is attached to the tilter device. A panner device 148 is rotatably attached to a bottom side of the second yoke and is connected to the body of the gun for panning movement of the gun. The first yoke and second yoke in the illustrated embodiment each comprise a horizontal plate having a first end and a second end and vertical plates attached to the first end and second end of the horizontal plates. Radio receiver circuits and power supplies are operably associated with the tilter and panner devices to provide for their radiowave actuation from a remote location, such as by cell phone and tower. A camera 150 and associated radio circuitry is provided for viewing the direction of the barrel 152 of the gun. The assembly can be carried by a drone or a remotely operated vehicle. The remaining elements shown can be as previously described, and elements as previously described but not shown can be provided on the embodiment as well.

While certain preferred embodiments have been described herein, the invention is not to be construed as being so limited, except to the extent that such limitations are found in the claims.

What is claimed is:

1. Apparatus comprising:
   an electropneumatically operated semi-automatic ball gun comprising a body, a barrel attached to the body, a tank for propellant attached to the body, a loader attached to the body for feeding balls to the barrel, a battery for providing electrical power, and a radio receiver for receiving a radio signal from a remote transmitter and providing an electrical signal that passes through circuitry to actuate a solenoid valve to permit propellant flow from the tank for propellant to fire a ball from the loader through the barrel,
   wherein the body of the gun has a top side and a bottom side, said apparatus further comprising, in combination, a carrier for the gun, said carrier comprising
   a plate, and
   a plurality of legs extending downwardly from the plate to position the body of the gun in a space defined between the legs that is above ground level,
   the body of the gun being attached beneath the plate with a powered gimbal and hanging otherwise unsupported in the space defined between the plurality of legs.

2. Apparatus as in claim 1 further comprising, in combination, at a remote location, a portable hand-held radio-wave transmitter.

3. Apparatus as in claim 1 further comprising, in combination, a cell phone tower.

4. Apparatus as in claim 1 wherein the loader comprises a gravity feeding tube containing pepperballs.

5. Apparatus as in claim 4 wherein the loader further comprises a second gravity feeding tube containing breakerballs.

6. Apparatus as in claim 5 wherein the loader further comprises an electrically actuated driver for selecting which tube to place in feeding communication with the barrel and the radio receiver further provides an electrical signal that passes through circuitry to actuate the driver.

7. Apparatus as in claim 1 further comprising a digital video camera mounted to the gun oriented to record an area aligned with the barrel including an aiming point for the gun.

8. Apparatus as in claim 7 further comprising a laser mounted to the gun for producing a laser beam to indicate by laser beam illumination the aiming point for the gun.

9. Apparatus as in claim 7 further comprising a radio transmitter mounted to the gun, said radio transmitter operably associated with the digital video camera for transmitting images including of the aiming point to a to a radio receiver at a remote location.

10. Apparatus as in claim 9 further comprising, in combination at the remote location, a radiowave receiver including a viewer screen for viewing transmitted images from the digital video camera.

11. Apparatus as in claim 10 wherein the carrier further comprises a pair of parallel skids attached to the legs.

12. Apparatus as in claim 1 wherein said carrier further comprises a light and a speaker wired to the radio receiver for remote actuation.

13. Apparatus as in claim 1 further comprising, in combination, a remotely operated quadracopter drone attached to the top side of the plate.

14. Apparatus as in claim 1 further comprising, in combination, a remotely operated vehicle having a tiltable bed attached to the plurality of legs.

15. Apparatus as in claim 1 further comprising, in combination, a shelf protruding from a wall, said shelf being attached to the plurality of legs.

16. Apparatus as in claim 1 wherein the the powered gimbal connects the bottom side of the plate to the body of the gun and provides tilt and pan functionality to the gun with respect to the plate.

17. Apparatus as in claim 16 wherein the powered gimbal comprises a first yoke attached the bottom side of the plate, a tilter device rotatably attached to the first yoke for tilting movement with respect to the first yoke, a second yoke attached to the tilter device, a panner device attached to a bottom side of the second yoke and connected to the body of the gun for panning movement of the gun.

18. Apparatus as in claim 17 wherein the carrier comprises a closed polygonal base with the legs connecting the base to the plate, the polygonal base being defined by folded members and the legs being defined by tubular members, and said first yoke and said second yoke each comprise a horizontal plate having a first end and a second end and vertical plates attached to the first end and second end of the horizontal plates.

19. Apparatus as in claim 18 further comprising a first radio receiver circuit operably associated with the tilter device to provide for actuating the tilter from a remote location, and a second radio receiver circuit operably associated with the panner device to provide for actuating the panner from a remote location.

\* \* \* \* \*